April 26, 1949.  J. T. LEONARD  2,468,675
LUBRICANT MEASURING DEVICE
Original Filed May 27, 1944  2 Sheets-Sheet 1
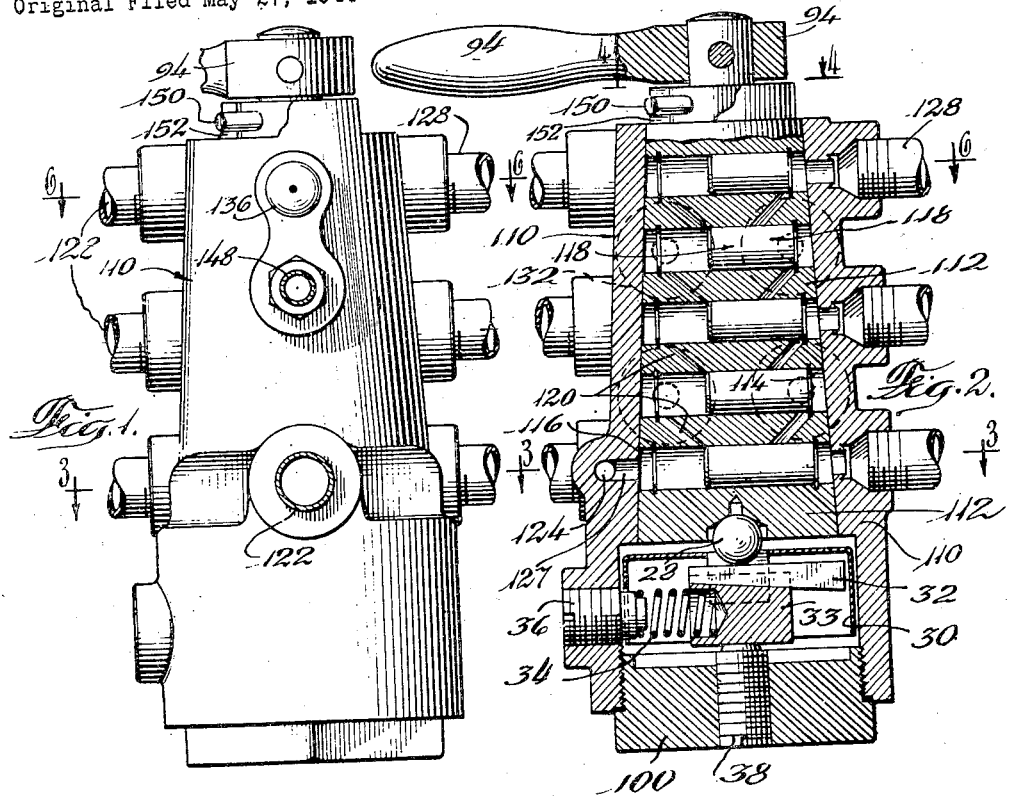
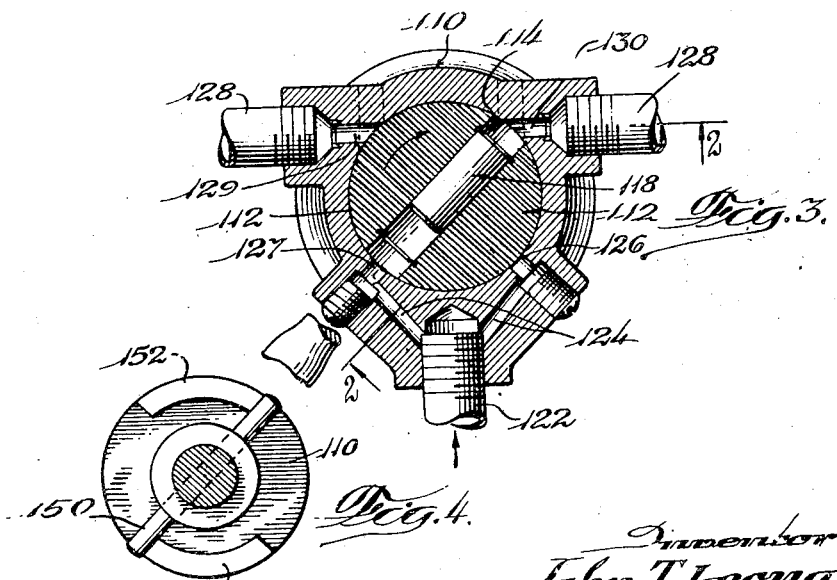
Inventor:
John T. Leonard
By Hinkle, Horton, Ahlberg, Naumann & Wupper
Attorneys April 26, 1949. J. T. LEONARD 2,468,675
LUBRICANT MEASURING DEVICE
Original Filed May 27, 1944 2 Sheets-Sheet 2
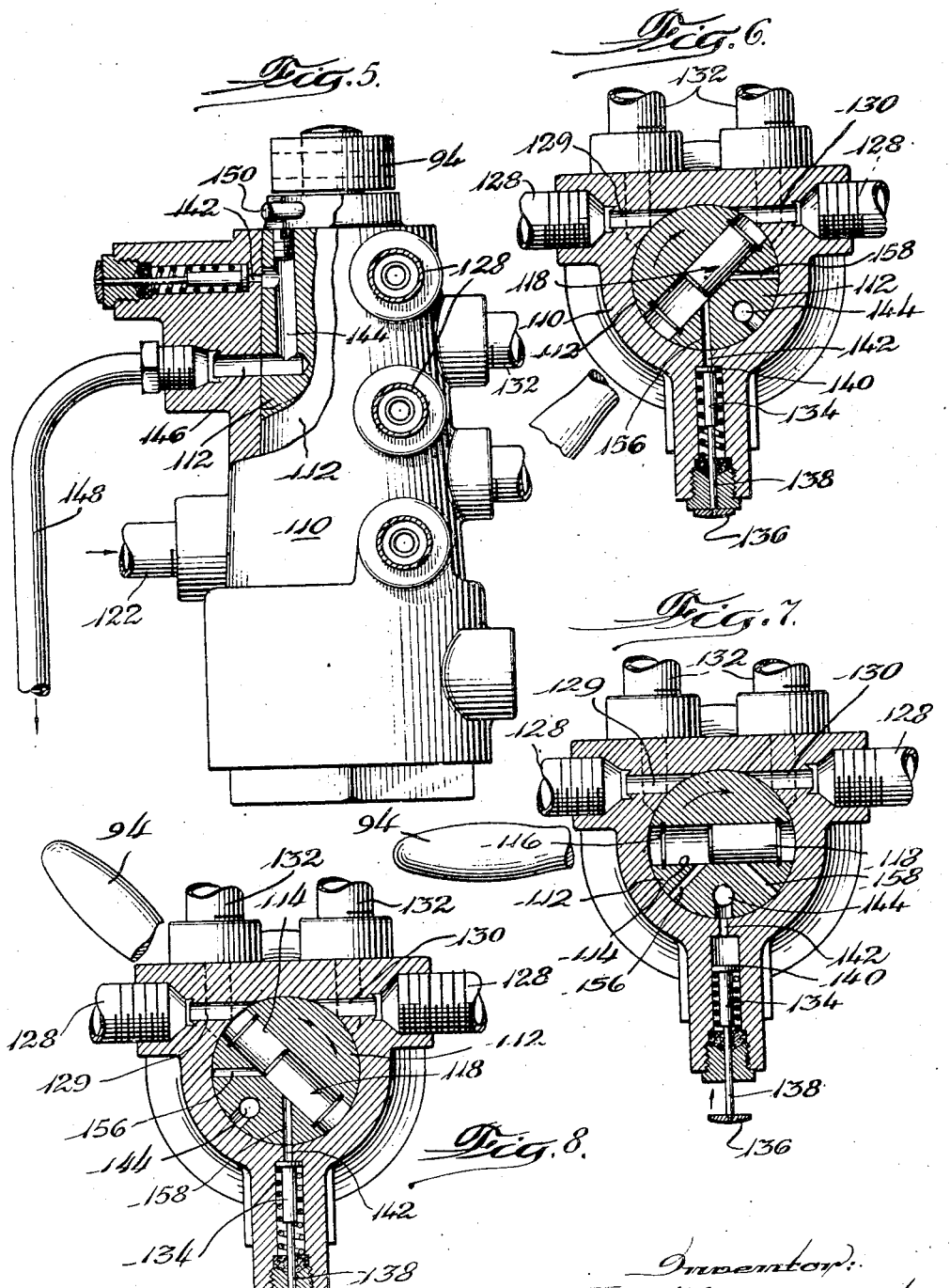

Patented Apr. 26, 1949

2,468,675

UNITED STATES PATENT OFFICE 2,468,675

LUBRICANT MEASURING DEVICE

John T. Leonard, Evanston, Ill.

Original application May 27, 1944, Serial No. 537,720. Divided and this application June 26, 1947, Serial No. 757,156

5 Claims. (Cl. 184—7)

My invention relates generally to centralized lubricating systems, and more particularly to improved means for dividing the lubricant supply into a plurality of measured charges individual to the several bearings to be lubricated.

It is an object of my invention to provide a simple multiple-unit lubricant measuring apparatus which is capable of controlling the supply of individually measured charges of lubricant to a plurality of bearings by means of a single manual operation.

A further object is to provide an improved lubricant distributing valve.

A further object is to provide an improved plug valve mechanism incorporating a plurality of lubricant measuring devices.

Other objects will appear from the following description, reference being had to the acompanying drawings, in which Fig. 1 is a side elevational view of the invention;

Fig. 2 is a longitudinal sectional view, taken on the line 2—2 of Fig. 3;

Fig. 3 is a transverse sectional view, taken on the line 3—3 of Fig. 1;

Fig. 4 is a transverse sectional view, taken on the line 4—4 of Fig. 2;

Fig. 5 is a side elevational view, partly in section, showing the connections to the indicator;

Fig. 6 is a transverse sectional view, taken on the line 6—6 of Fig. 2; and

Figs. 7 and 8 are views similar to Fig. 6, showing the valve plug in its opposite and intermediate positions, respectively.

This application is a division of my copending application Serial No. 537,720, filed May 27, 1944 and now Patent Number 2,427,680.

The invention as disclosed herein comprises a valve body 110 having a tapered bore for the reception of a rotatable tapered valve plug 112. The plug is maintained in tight sealing relationship in the bore of the body 110 by a spring 34 which, through cooperating wedges 32 and 33 and a ball 28, presses the valve plug 112 into the bore of the body 110. The initial position of the wedges 32 and 33 is controlled by an adjusting screw 38 threaded in a plug 100 which closes the lower end of the bore in the valve body 110. The degree of compression of the spring 34 may be adjusted by a set screw 36 and the wedges 32, 33 and the ball 28 are maintained in operative position by a pressed metal inverted cuplike cage 30. Thus, as wear between the valve plug 112 and the body 110 takes place, the spring 34, through the operation of the wedges 32 and 33 and ball 28, moves the plug inwardly into the body 110 so as to take up such wear.

There are five cylinders 114 formed in the plug 112, these cylinders being provided with split stop rings 116 fitting in suitable grooves in the cylinder walls. Within each of the cylinders 114 is a solid piston 118, these pistons being of different lengths to compensate for the different lengths of the cylinders in which they operate, and thereby to secure uniform volumetric discharge therefrom. The cylinders 114 are connected in series by a plurality of diagonal ducts 120.

Lubricant is supplied through a pipe 122 (Fig. 3) which connects with pairs of ducts 124 terminating in inlet ports 126, 127. There are provided six outlet pipes 128 leading laterally from the body 110 to bearings to be lubricated, these pipes communicating with outlet ports 129, 130, while there are four pipes 132 leading from the rear side of the body 110 to bearings, these pipes 132 communicating with ports similar to the ports 129 and 130, as indicated by the dotted lines in Fig. 7.

A pressure indicator 134 is provided with an indicator button 136 secured to a spring-pressed plunger 138 having a piston 140 at the other end thereof. This piston is subjected to lubricant pressure supplied through a port 142. The plug 112, as best shown in Fig. 5, is provided with a passageway 144, one end of which is adapted, under certain conditions, to register with the port 142, while the other end registers with an exhaust port 146, which a pipe 148 connects to a part to be lubricated. The plug 112 is provided with a handle 94 and has a stop pin 150 (Fig. 4) projecting therethrough, the ends of this pin being adapted to engage arcuate lugs 152 formed on the body 110 so as to limit the angular movement of the plug 112 to 90°.

In operation, when lubricant is supplied through the conduit 122 and the valve plug 112 is in the position shown in Fig. 3, lubricant will be supplied through the inlet port 127 to the lowermost cylinder 114 and force the piston 118 therein to the position in which it is shown in Fig. 3, such movement of the piston 118 forcing a measured quantity of lubricant from the opposite end thereof through the associated port 130 and pipe 128 to the bearing. When the lowermost piston has moved a sufficient distance to uncover the end of the passageway 120 (Fig. 2) which is nearest the inlet port 127, lubricant flows through this passageway into the second lowermost cylinder 114 and moves the piston 118 therein in a similar manner. The remaining pistons 118 are thereafter progressively moved to the positions in which they are shown in Fig. 2, thereby discharging the lubricant therefrom to their associated bearings.

When the uppermost piston 118 has thus been moved, lubricant flows from the pressure end of its cylinder through a passageway 156 to the inlet port 142 of the indicator, forcing the plunger 138 thereof outwardly to provide a visible and tactile signal to show that all of the pistons have been operated. When this occurs, the operator, by means of the handle 94, turns the valve plug 112 clockwise from the position in which it is shown in Figs. 3 and 6, to the position in which it is shown in Fig. 8. In the course of such movement, the passageway 144 registers with the indicator port 142, as shown in Fig. 7, thereby permitting the spring-pressed plunger 138 to move inwardly and discharge lubricant contained in the plunger cylinder through the passageway 144 to the outlet port 146, the indicator thus returning to normal position.

When the plug has been moved to the position in which it is shown in Fig. 8, the opposite end of the lowermost cylinder 114 is brought into registry with the inlet port 126 and lubricant is thus supplied to the lowermost cylinder 114, forcing the plunger in the opposite direction and discharging the lubricant ahead of the piston to the outlet port 129 associated therewith, and hence to the bearing. Upon movement of the piston 118 sufficiently to uncover the end of the passageway 120 on the pressure side of the piston, lubricant flows from the lowermost cylinder 114 to the next adjacent cylinder, and operates the piston therein in a similar manner. The remaining pistons are progressively operated in succession until the uppermost piston 118 has been moved to discharge lubricant through its associated port 129 to the bearing. When this uppermost piston 118 has moved from the position in which it is shown in Fig. 8 to fully discharge the lubricant ahead of it, the piston will uncover the end of a passageway 158 which at this time is in communication with the port 142 of the indicator, and thus will apply pressure to the plunger of the latter and move it outwardly, and thereby indicate to the operator that the lubrication operation has been completed.

The lubricating operation is very simple, since, assuming that lubricant under pressure is being supplied through the inlet pipe 122, the operator need merely shift the valve body 112 in one direction through an angle of 90° and hold it in such position until the indicator button 136 is projected to show the completion of this phase of the lubricating operation, whereupon the operator will swing the valve 90° in the opposite direction to cause the lubricant to be supplied to the remaining bearings. Hence, it is seen that the valve body may be moved between two positions, which may be referred to as positions A and B. In this way a plurality of bearings (11 in the embodiment illustrated) may be substantially simultaneously lubricated by a simple operation.

While the cylinders 114 are illustrated as being of the same diameter and the strokes of the pistons 118 as being equal, so that the displacement of the pistons is equal, this is not essential and the pistons may, if desired, be made of different diameters and of different strokes so as to provide different metered charges of lubricant to various bearings.

While I have shown and described a particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. A lubricating device comprising, a valve body having a plug rotatable therein between two extreme positions, a plurality of outlet ports in said body, said plug having a plurality of cylindrical bores therein, pistons reciprocable in said bores respectively, means for limiting the strokes of said pistons, an inlet port and passageways for conveying lubricant to one end of one of said bores when said plug is in one extreme position and to the opposite end thereof when said plug is in its other extreme position, and a pair of passageways leading from each of said bores to the next adjacent bore, each of said passageways extending from a midportion of one of said bores to the adjacent end of the next adjacent bore, said pistons each being of such length as to uncover one of said passageways when at one end of its stroke and to uncover the other of said passageways when at the other end of its stroke.

2. The combination set forth in claim 1, in which said outlet ports are arranged in two groups and in which said plug may be rotated from a position in which one end of each of said bores is in alignment with an outlet port of one group to a position in which the opposite end of each of said bores is in alignment with an outlet port of the other group.

3. In a lubricating system, the combination of a valve body having a plug rotatable therein between positions A and B, a plurality of outlet ports in said body, means for conveying lubricant from said outlet ports to parts to be lubricated, said plug having a series of cylindrical bores therein, pistons reciprocable in said bores respectively, means for limiting the strokes of said pistons, an inlet port for conveying lubricant to one end of one of said bores when said plug is in position A and to the opposite end of said bore when said plug is in position B, and passageways leading from each of said bores to the next adjacent bore, each of said passageways extending from a midportion of one of said bores to the adjacent end of the next adjacent bore, said pistons each being of such length as to uncover one of said passageways when at one end of its stroke and to uncover the other of said passageways when at the other end of its stroke, whereby upon supplying lubricant under pressure to said inlet when said plug is in position A said pistons will successively operate in one direction to discharge measured charges of lubricant to the parts to be lubricated and when said plug is in position B said pistons will be moved successively in the opposite direction to replenish the charges previously discharged and to discharge measured charges to the parts to be lubricated.

4. The combination set forth in claim 3, in which a pressure indicator is provided and in which the passageways leading from the last of said series of cylindrical bores connect with said pressure indicator when said plug is in either position A or position B.

5. The combination set forth in claim 3, in which a pressure indicator is provided, in which the passageways leading from the last of said series of cylindrical bores connect with said pressure indicator when said plug is in either position A or position B, and in which means are provided to release lubricant under pressure from said pressure indicator when said plug is at a position intermediate its positions A and B.

JOHN T. LEONARD.

No references cited.